United States Patent
Shimotono

(10) Patent No.: US 10,606,413 B2
(45) Date of Patent: Mar. 31, 2020

(54) APPARATUS, METHOD, AND PROGRAM PRODUCT FOR DETERMINING THE LOCATION OF A PORTABLE ELECTRONIC DEVICE ON A DISPLAY

(71) Applicant: LENOVO (Singapore) PTE. LTD., New Tech Park (SG)

(72) Inventor: Susumu Shimotono, Hadano (JP)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 236 days.

(21) Appl. No.: 14/964,145

(22) Filed: Dec. 9, 2015

(65) Prior Publication Data

US 2016/0162066 A1   Jun. 9, 2016

(30) Foreign Application Priority Data

Dec. 9, 2014  (JP) ................ 2014-248629

(51) Int. Cl.
  *G06F 3/042*   (2006.01)
  *G06F 3/14*    (2006.01)
  *G06F 3/0488*  (2013.01)

(52) U.S. Cl.
  CPC .......... *G06F 3/042* (2013.01); *G06F 3/0488* (2013.01); *G06F 3/1423* (2013.01);
  (Continued)

(58) Field of Classification Search
  CPC ........ G09G 2370/042; G09G 2370/06; G09G 2370/16; G09G 2370/02; G09G 2356/00; G06F 3/042; G06F 3/0488; G06F 3/1423
  See application file for complete search history.

(56) References Cited

U.S. PATENT DOCUMENTS

2002/0152094 A1*  10/2002  Fahraeus ............ G06F 3/03545
                                                   705/500
2007/0009253 A1*  1/2007   Nikkanen ............ G03B 7/097
                                                   396/234
(Continued)

FOREIGN PATENT DOCUMENTS

JP   2005-317032   11/2005
JP   2006-153506   6/2006
(Continued)

OTHER PUBLICATIONS

Maki Sugimoto et al, "A Display-Based Position and Orientation Measurement System Using Fiducial Images", Transactions of the Virtual Reality Society of Japan, vol. 10, No. 4, Dec. 2005, 16 pages.

*Primary Examiner* — Carolyn R Edwards
(74) *Attorney, Agent, or Firm* — Kunzler Bean & Adamson

(57) ABSTRACT

The position of a smartphone placed on a touchscreen is determined. Smartphones are placed on a touchscreen of a table PC, and user interface images are displayed respectively around the smartphones to perform cooperation. The table PC displays a position pattern to determine the position of a smartphone being placed. The position pattern includes a pattern of two tones. A camera of the smartphone captures a blurred image of a predetermined location of the position pattern. The table PC identifies the position of the smartphone, from a tone value of the captured image received wirelessly from the smartphone. The table PC can thus determine the position of the smartphone without using special hardware.

19 Claims, 13 Drawing Sheets

(52) U.S. Cl.
CPC ..... *G09G 2356/00* (2013.01); *G09G 2370/02* (2013.01); *G09G 2370/042* (2013.01); *G09G 2370/06* (2013.01); *G09G 2370/16* (2013.01)

(56) References Cited

U.S. PATENT DOCUMENTS

2013/0076894 A1* 3/2013 Osman ................ H04W 4/029
                                                  348/135
2013/0093713 A1* 4/2013 Bose .................. G06F 3/04883
                                                  345/174

FOREIGN PATENT DOCUMENTS

| JP | 2007-310683 | 11/2007 |
| JP | 3185211 U | 8/2013 |
| JP | 2014-188322 | 10/2014 |
| JP | 2015-115046 | 6/2015 |
| WO | 2012/070593 A1 | 5/2012 |

* cited by examiner

APPARATUS, METHOD, AND PROGRAM PRODUCT FOR DETERMINING THE LOCATION OF A PORTABLE ELECTRONIC DEVICE ON A DISPLAY

The present invention relates to a technique of determining the position of a device placed on a display, and also relates to a technique whereby one device determines the position of another device that cooperates with the device.

BACKGROUND

A table PC is a personal computer that has a table-like touchscreen operable simultaneously by a plurality of users. Examples of such a table PC, for example include the Microsoft® Corporation PixelSense®, and Lenovo® Corporation HORIZON. Table PCs are generally capable of recognizing an object such as a smartphone placed on the touchscreen but the manner of determining the exact location of the object is lacking. If the table PC were capable of determining the position of the smartphone, then the table PC would be able to display an image relating to the operation of the smartphone on the touchscreen around the smartphone to exchange content, or display a large image of a user interface (UI) to the smartphone.

SUMMARY

To determine the position of the smartphone on the touchscreen, special hardware using pressure, electric field intensity, surface acoustic wave, infrared light, or the like is typically needed. Although a touch position on a capacitance touchscreen may be able to be detected as the position of the smartphone, this requires the chassis of the smartphone to be conductive or a conductive pad to be attached to the chassis. It is therefore advantageous if the position or the direction can be determined using a device normally included in a smartphone or a tablet terminal, with no need for special hardware or pad attachment.

The embodiments provided herein provide a method of determining the position of a device that in some embodiments does not require special hardware and may also have a low power consumption. A first embodiment provides a computing device capable of cooperating with a portable electronic device equipped with a camera by displaying an image on a touchscreen. The computing device includes: an image data transfer unit for outputting display data of an identification image to the touchscreen; a communication module for receiving identification data relating to imaging data obtained by capturing the identification image by the camera of the portable electronic device placed on the touchscreen, from the portable electronic device; and a control unit for determining a position of the portable electronic device on the touchscreen, based on the identification image and the identification data.

With this structure, the computing device can determine the position of the portable electronic device on the touchscreen necessary for the cooperation, without using special hardware. The touchscreen may be incorporated in the chassis of the computing device, or connected by a wired or wireless interface. The identification data may be the imaging data or a tone value or bit string obtained by extracting the feature of the imaging data.

A distance of the identification image from the camera may be shorter than a distance that allows the camera to be brought into focus. The identification image may include a pattern of two tones. The identification image may include a grayscale pattern of n tones (n is an integer greater than or equal to 3). The identification image may include a color pattern. The use of the grayscale or color pattern allows more information to be included in the identification image, with it being possible to reduce the number of patterns to be displayed.

The image data transfer unit may output display data of a plurality of identification images in sequence, each identification image allowing the position to be determined more finely than a preceding identification image. The position can be determined more accurately in this way. The control unit may determine the position based on a last displayed identification image and identification data relating to the last displayed identification image. The image data transfer unit may output display data of an identification image for determining a direction of the portable electronic device, to the determined position. By determining the direction, a highly convenient user interface image can be displayed around the portable electronic device.

When the computing device includes an application execution unit for outputting display data of an application image to the image data transfer unit at a predetermined frame rate, the image data transfer unit may decrease the predetermined frame rate and assign part of frames to the identification image. As a result, while displaying the application image, the identification image can be displayed without affecting the display of the application image.

A second embodiment provides a portable electronic device capable of cooperating with a computing device on a touchscreen on which the computing device displays an image. The portable electronic device includes: a camera module; an identification data calculation unit for calculating identification data relating to imaging data obtained by capturing an identification image displayed on the touchscreen by the camera module in a state where the portable electronic device is placed on the touchscreen; and a control unit for transmitting the identification data to the computing device so that the computing device determines a position of the portable electronic device on the touchscreen.

With this structure, the portable electronic device can generate, from the imaging data of the camera module, the identification data that enables the computing device to determine the position, and transmit the identification data. The imaging data may be data of a blurred image. When identification images are displayed on the touchscreen in sequence where each identification image allows the position to be determined more finely than a preceding identification image, the control unit may transmit identification data each time an identification image is captured. Alternatively, the control unit may transmit identification data arranged in image capture order, after the identification images are captured. In this case, the power consumption of the portable electronic device can be lowered by reducing the number of times identification data is transmitted.

The control unit may transmit attribute information for determining a physical shape of the portable electronic device, to the computing device. This enables the computing device to determine the outline of the chassis on the touchscreen more accurately. When the portable electronic device includes an attitude sensor for detecting that the portable electronic device is placed on the touchscreen, the control unit may receive a signal of the attitude sensor, and transmit a timing signal for starting the display of the identification image, to the computing device. Thus, the user can use the UI simply by placing the portable electronic device on the touchscreen.

According to certain embodiments, it is possible to provide a method of determining the position of a device placed on a display. According one embodiment, it is also possible to provide a method of determining the position of a device without using special hardware. According to certain embodiments, it is also possible to provide a method of determining the position of a device with low power consumption. Embodiments disclosed herein provide a computer program, computing device, and portable electronic device for realizing such method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
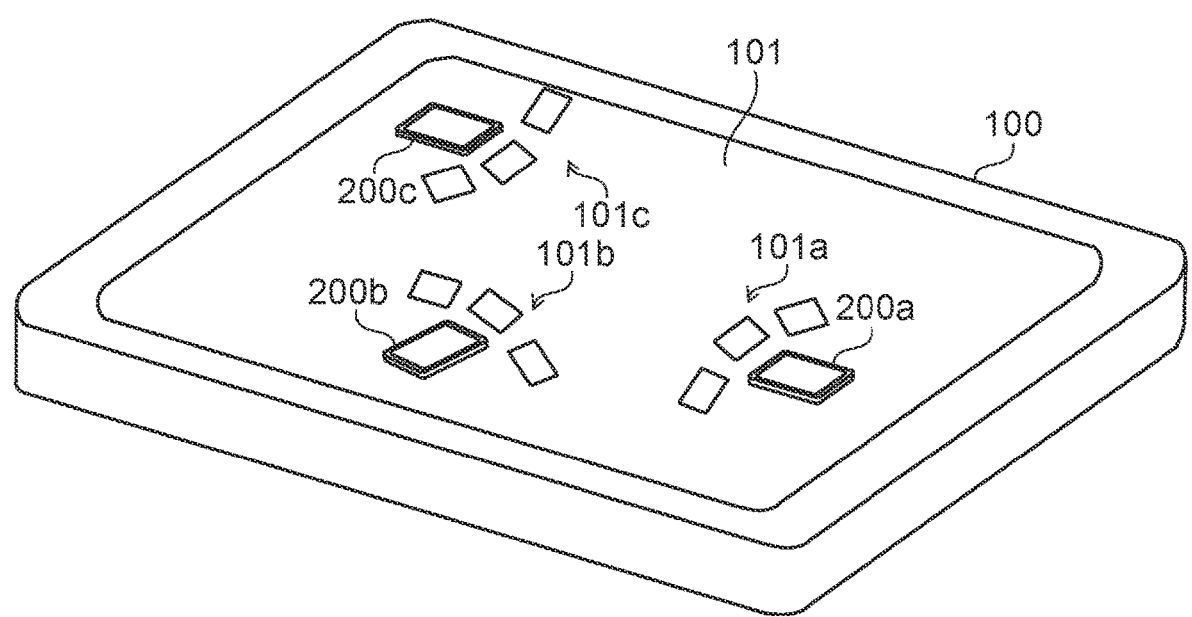
FIG. 1 is a diagram illustrating a situation where a table PC 100 and smartphones 200*a* to 200*c* cooperate with each other.

FIG. 1 is a diagram illustrating a situation where a parent device and a gadget device operate in cooperation (cooperate) on a touchscreen. FIG. 1 illustrates a table PC 100 having a touchscreen 101 used horizontally as an example of the parent device, and smartphones 200*a* to 200*c* each as an example of the gadget device.

An overview of the parent device and the gadget device is given first. The parent device and the gadget device include communication modules for wirelessly communicating with each other. The gadget device has a camera, and the parent device has a touchscreen. According to certain embodiments, the position of the gadget device can be determined using only the display function of the touchscreen, without using the touch panel function of the touchscreen.

The gadget device may have a touchscreen. As a precondition for the need to determine the position, the touchscreen of the parent device is larger in size than the chassis of the gadget device. The gadget device may be typically a portable electronic device which is convenient to carry around, though the present embodiments is not limited to such.

Upon the cooperation, the chassis of the gadget device is placed on the touchscreen of the parent device in the state where the lens of the camera on the back side faces the touchscreen. As a typical example of the placement, the gadget device is left on the horizontal touchscreen. As another example of the placement, the gadget device is positioned so that the chassis of the gadget device is in close contact with the touchscreen in any attitude. In the cooperation, the parent device and the gadget device transfer data bi-directionally, or the parent device displays, on the touchscreen, a UI for the parent device and the gadget device performing some kind of process in cooperation.

As an example of the cooperation, when the gadget device that stores many photos is placed on the touchscreen, the parent device displays photo thumbnails and holders in the parent device as a UI around the gadget device placed on the touchscreen. When the user touches a predetermined thumbnail photo and drags it to a predetermined holder, the corresponding photo data is transferred from the gadget device to the holder in the parent device through wireless communication.

As another example of the cooperation, when the gadget device is placed on the touchscreen, the parent device enlarges the screen displayed on the touchscreen of the gadget device and displays the enlarged screen on the touchscreen of the parent device, thus providing a UI to the gadget device. As yet another example of the cooperation, when a plurality of gadget devices are placed on the touchscreen of the parent device, the gadget devices communicate with each other using a UI provided by the parent device.

In FIG. 1, UI images 101*a* to 101*c* are displayed respectively around the smartphones 200*a* to 200*c*. A tablet terminal larger than a smartphone can serve as a parent device to a smartphone, and a gadget device to a table PC. In order to display the convenient UI images 101*a* to 101*c*, the table PC 100 needs to determine the position, direction, and orientation of each of the smartphones 200*a* to 200*c* on the touchscreen 101.

Figure 2:
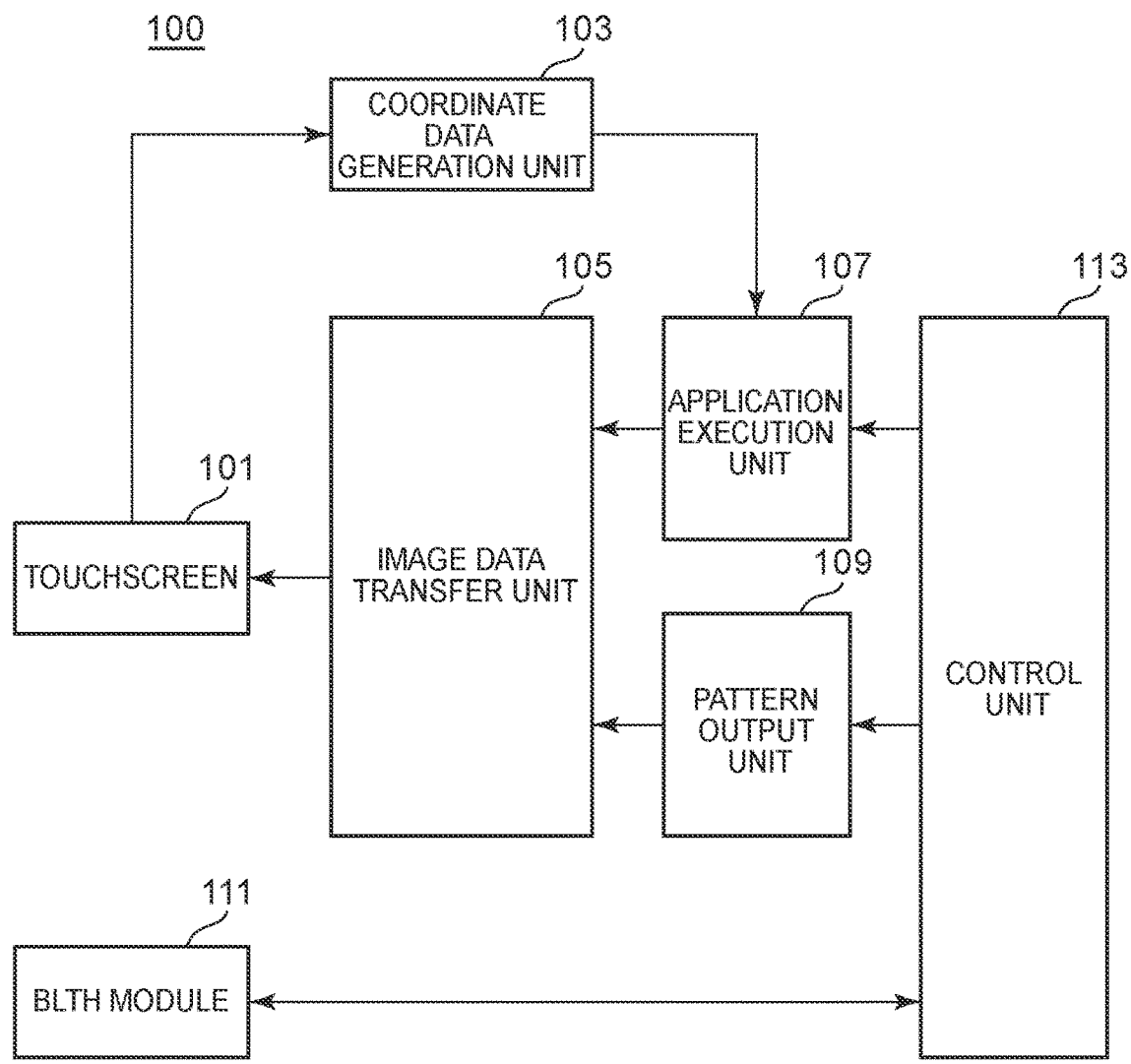
FIG. 2 is a functional block diagram illustrating an example of the structure of the table PC 100 according to an embodiment.
Figure 2:
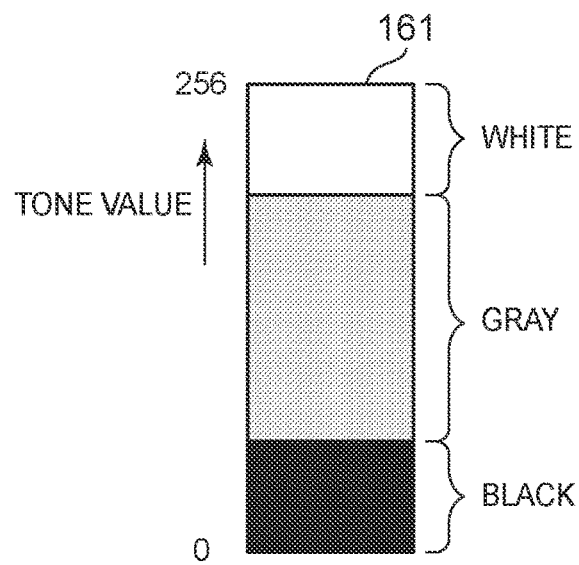

FIG. 2 is a functional block diagram illustrating an example of the structure of the table PC 100 according to an embodiment. The table PC 100 includes the touchscreen 101, a coordinate data generation unit 103, an image data transfer unit 105, an application execution unit 107, a pattern output unit 109, a Bluetooth® module (BLTH module) 111, and a control unit 113.

The coordinate data generation unit 103, the image data transfer unit 105, the application execution unit 107, the pattern output unit 109, and the control unit 113 are realized by hardware such as a CPU, system memory, nonvolatile memory, and a chipset and software such as a device driver, operating system, and application program executed by the CPU. The coordinate data generation unit 103 outputs coordinate data generated upon detecting a touch operation on the touchscreen 101, to the application execution unit 107.

The application execution unit 107 executes an application program for the cooperation, and outputs data of an application image to the image data transfer unit 105 at a predetermined frame rate. The application image includes the UI images 101a to 101c. The pattern output unit 109 holds data of a plurality of position patterns and direction pattern for determining the position, direction, and orientation of each of the smartphones 200a to 200c, and outputs data of a position pattern or direction pattern designated by the control unit to the image data transfer unit 105 at a timing designated by the control unit.

The image data transfer unit 105 outputs the data of the application image and the data of the position pattern or direction pattern to the touchscreen 101, for example at the same frame rate as the refresh rate of the touchscreen 101. The BLTH module 111 is an example of a communication module for wirelessly communicating with the smartphones 200a to 200c. The BLTH module 111 may be replaced with, for example, a Wi-Fi module or NFC module operating in ad hoc mode. The control unit 113 controls the operation of each component to recognize the planar presence of each of the smartphones 200a to 200c in the coordinate system of the touchscreen 101.

The control unit 113 receives identification data relating to imaging data from each of the smartphones 200a to 200c via the BLTH module 111. As an example, the identification data may be the original imaging data, or a tone value or bit string calculated from the imaging data by each of the smartphones 200a to 200c. The control unit 113 selects, based on the identification data, a position pattern or direction pattern to be displayed on the touchscreen 101, calculates the display coordinates, and sets the pattern output unit 109.

In the case of receiving the imaging data from each of the smartphones 200a to 200c, the control unit 113 calculates a tone value of luminance from the imaging data. The control unit 113 can hold a threshold 161 for determining a part of a position pattern captured by each of the smartphones 200a to 200c from the tone value received from the smartphone or the tone value calculated from the imaging data. As an example, the threshold 161 includes a minimum or maximum tone value for determining black or white when assigning 256 tones to imaging data of a position pattern having shading of two tones.

The control unit 113 can determine the position of a lens 203a from the identification data received from each of the smartphones 200a to 200c, as the coordinates of the part of the position pattern. The control unit 113 outputs a timing signal for synchronizing the timing of displaying the position pattern or the direction pattern and the timing of image capture by each of the smartphones 200a to 200c, via the BLTH module 111. The control unit 113 receives a timing signal for starting the position determination from each of the smartphones 200a to 200c via the BLTH module 111, and controls the operation of each component.

Figure 3:
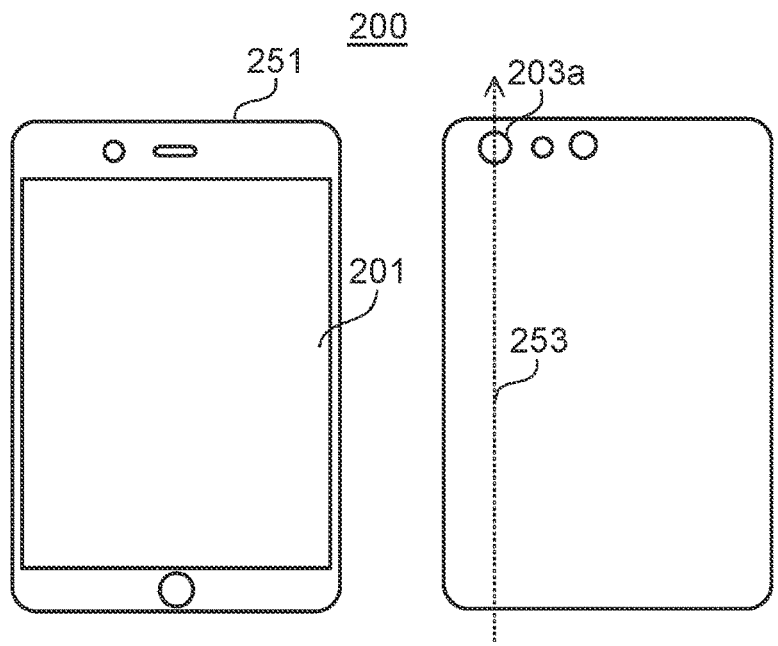
FIG. 3 is a plan view illustrating an example of the appearance of a smartphone 200.
Figure 4:
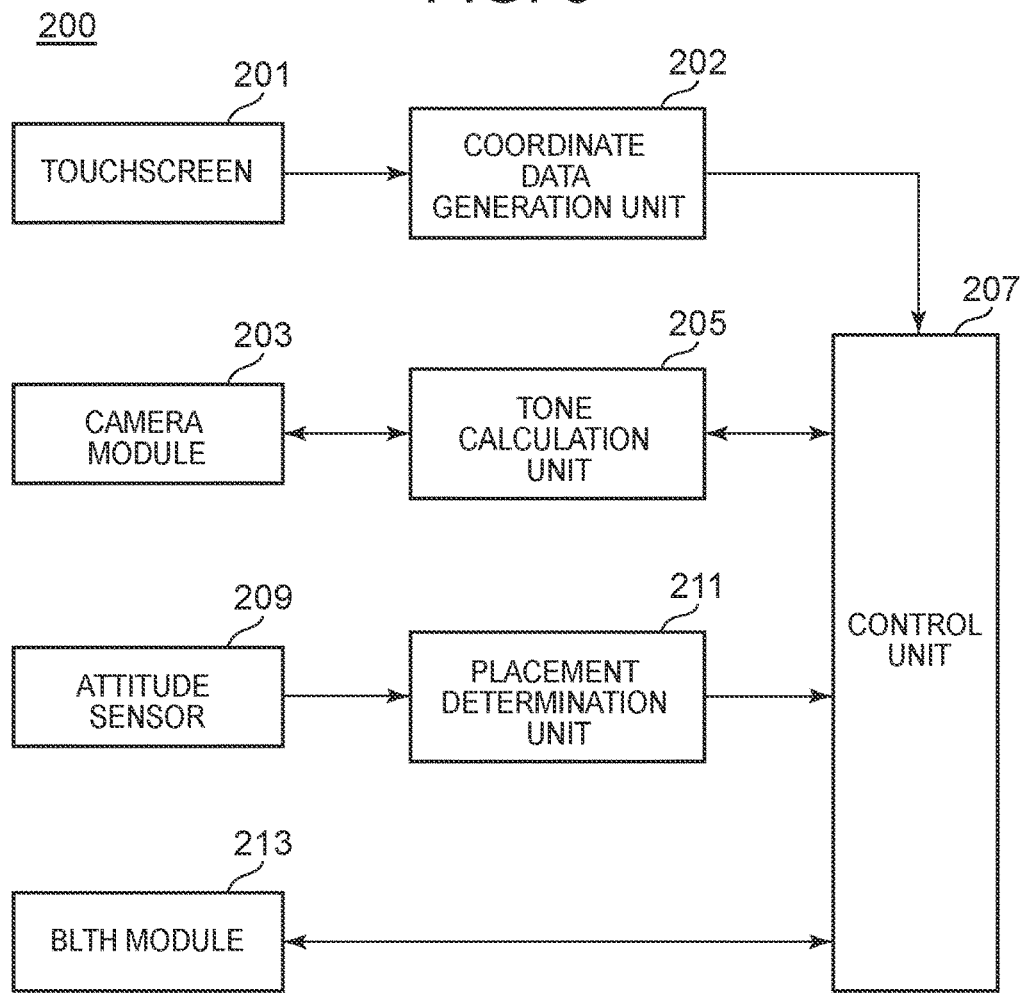
FIG. 4 is a functional block diagram illustrating an example of the structure of the smartphone 200 according to the embodiment.

FIG. 3 is a diagram illustrating an example of the appearance of a smartphone 200 corresponding to each of the smartphones 200a to 200c. The following describes the smartphone 200 as a representative of the smartphones 200a to 200c, though the smartphones 200a to 200c may have different appearances from each other according to certain embodiments. FIG. 4 is a functional block diagram illustrating an example of the structure of the smartphone 200 according to the embodiment.

The smartphone 200 is equipped with a touchscreen 201 on the front surface of a chassis 251, and a lens 203a of a camera module 203 on the back surface of the chassis 251. A line 253 passing through the center of the lens 203a and in parallel with the longer side of the chassis 251 is defined in the smartphone 200. The line 253 also indicates the upward direction, when the home screen display direction is defined as the vertical direction.

In FIG. 1, the smartphone 200 is placed on the horizontally positioned touchscreen 101 with the lens 203a facing downward. The user freely places the smartphone 200 on the touchscreen 101. The table PC 100 determines the position, direction, and orientation of the placed smartphone 200 for the cooperation, in the coordinate system defined on the touchscreen 101. Here, the position corresponds to the position of the lens 203a, and may be, for example, the coordinates of an element of a matrix 400 (FIG. 6) that can be identified by a row and a column. The direction corresponds to the direction of the line 253. The orientation corresponds to the vertical direction of the chassis 251. The line 253 indicates the direction and orientation of the smartphone 200 simultaneously.

In FIG. 4, a coordinate data generation unit 202 outputs coordinate data generated upon detecting a touch operation on the touchscreen 201, to a control unit 207. The camera module 203 operates in still image mode or moving image mode, and outputs imaging data to a tone calculation unit 205. In the still image mode, the camera module 203 outputs imaging data of one frame or a plurality of frames captured at a timing designated by the tone calculation unit 205. In the moving image mode, the camera module 203 outputs imaging data at a frame rate of 30 fps as an example. The camera module 203 includes a color filter, where the tone value of the imaging data corresponding to each color of RGB is converted in a predetermined format. The embodiments disclosed herein may, however, also be applicable to a camera module for capturing an image with shading of black and white.

The interval between the camera module 203 and the subject has a distance limit with which an image can be captured in focus, called a working distance or a shortest photographing distance. In the state of being placed on the touchscreen 101, the camera module 203 is nearer the image displayed on the touchscreen 101 than the imaging limit distance, and so the captured image is out of focus. Even in the case where the captured image is out of focus, it is possible to identify the tone value from the imaging data of the position pattern and determine the orientation from the direction pattern with required accuracy.

Although this embodiment describes the case where out-of-focus imaging data is used to determine the position or direction of the smartphone 200, the present embodiments are also applicable to the case where the camera module 203 in the placed state can capture an in-focus image. The tone calculation unit 205 calculates the tone value of the imaging data, and outputs the tone value to the control unit 207. In the case where the table PC 100 calculates the tone value, the smartphone 200 does not need to be provided with the tone calculation unit 205. This, however, increases overhead or power consumption in data transfer. An attitude sensor 209 includes a gyro sensor or an acceleration sensor, and detects the attitude or fluctuation state of the smartphone 200 and outputs it to a placement determination unit 211.

The placement determination unit 211 detects the state where the smartphone 200 is placed on the touchscreen 101. As an example, the placement determination unit 211 may determine the state where the smartphone 200 is stationary and the touchscreen 201 faces upward, as the placed state. The control unit 207 receives a timing signal from the table PC to determine the position, direction, and orientation of the smartphone 200, and controls each component. The control unit 207 outputs identification data and a timing signal necessary for the cooperation, to the table PC 100 via a BLTH module 213.

Figure 5:
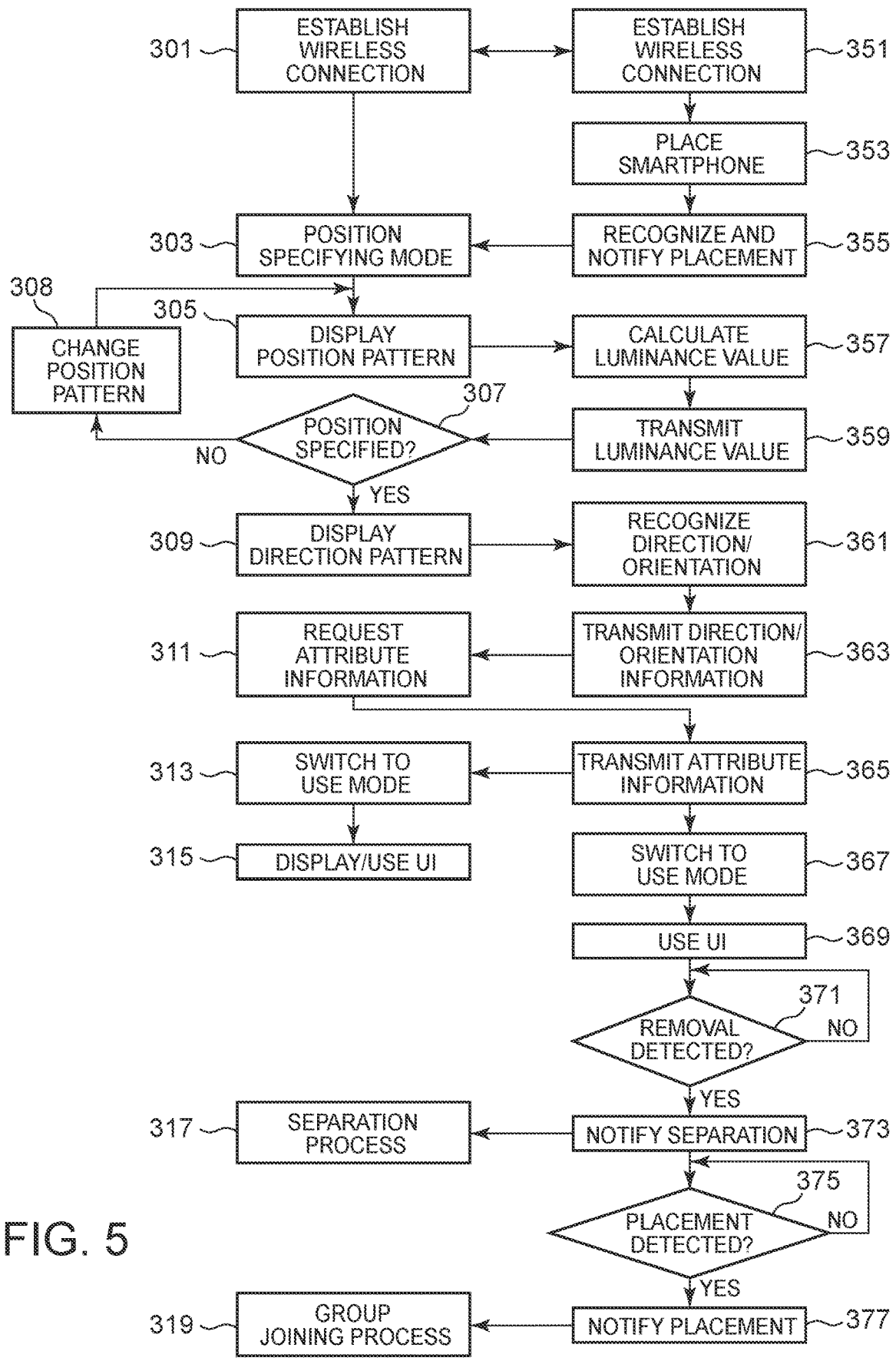
FIG. 5 is a flowchart illustrating a procedure when the table PC 100 and the smartphone 200 cooperate with each other.

FIG. 5 is a flowchart illustrating a procedure in which the table PC 100 determines the position, direction, and orientation of the smartphone 200 placed on the touchscreen 101. Blocks 301 to 319 show the procedure of the table PC, and blocks 351 to 377 show the procedure of the smartphone 200. In blocks 301 and 351, the BLTH modules 111 and 213 establish connection for wireless communication. In the table PC 100, the application execution unit 107 outputs data of an application image to the image data transfer unit 105. The image data transfer unit 105 transfers the image data to the touchscreen 101 at a frame rate of 60 fps as an example.

The touchscreen 101 displays the application image for cooperating with the smartphone 200 which has been generated by the application execution unit 107. In block 353, the user places the smartphone 200 at any position on the touchscreen 101. In block 355, the placement determination unit 211 detects the placed state of the smartphone 200 from the signal of the attitude sensor 209, and instructs the table PC 100 to switch to position determining mode.

Alternatively, the user may instruct the control unit 207 to switch to the position determining mode via the touchscreen 201. The control unit 207 instructs the tone calculation unit 205 to switch to the position determining mode. The tone calculation unit 205 wakes up the sleeping camera module 203, and controls the camera module 203 to perform calibration. The case where the camera module 203 starts operation in the still image mode is described as an example here. The control unit 207 transmits a timing signal for entering the position determining mode, to the table PC 100 via the BLTH module 213.

Figure 7:
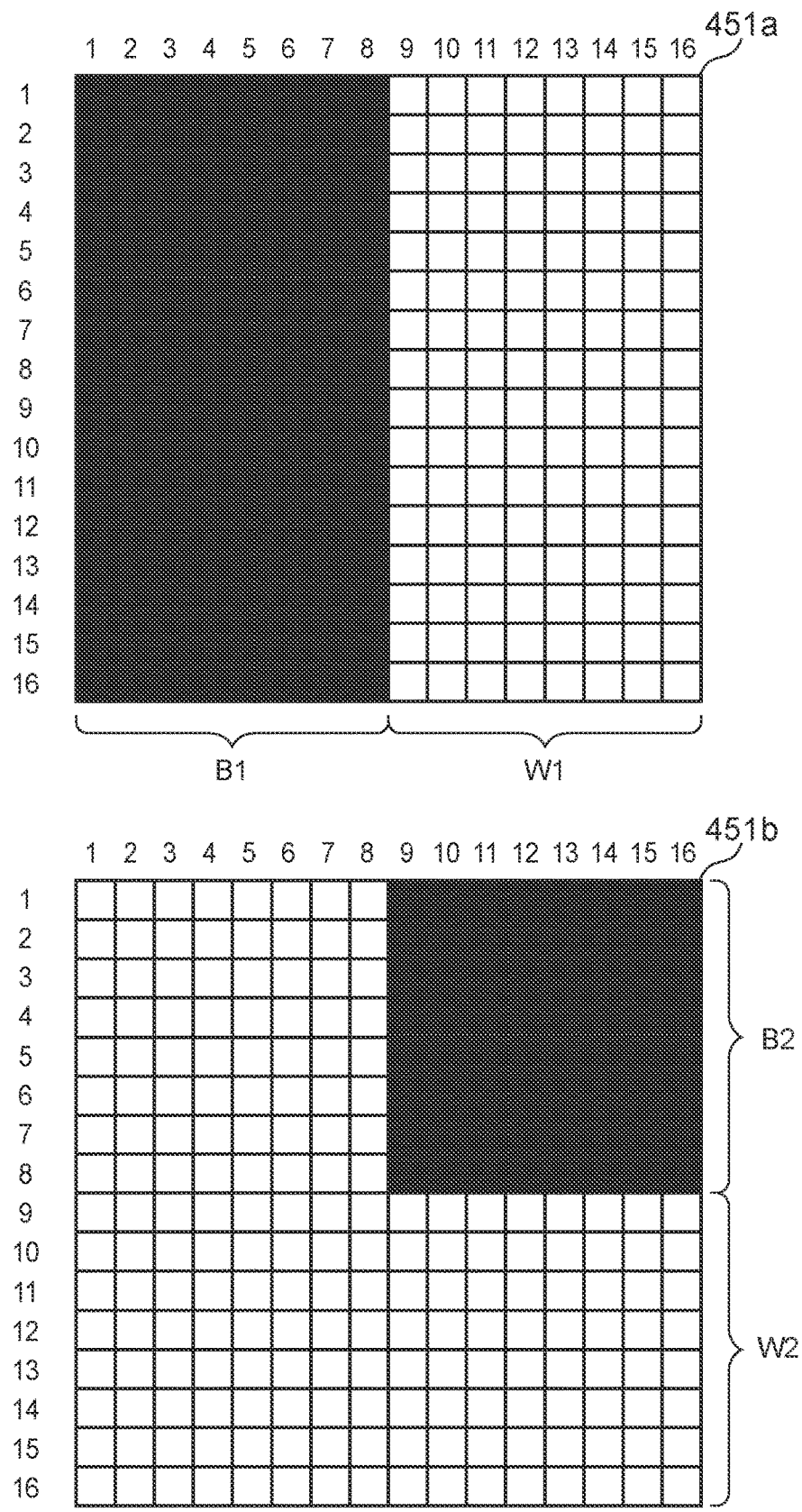
FIG. 7 is a diagram illustrating the structures of position patterns 451*a* and 451*b*.
Figure 8:
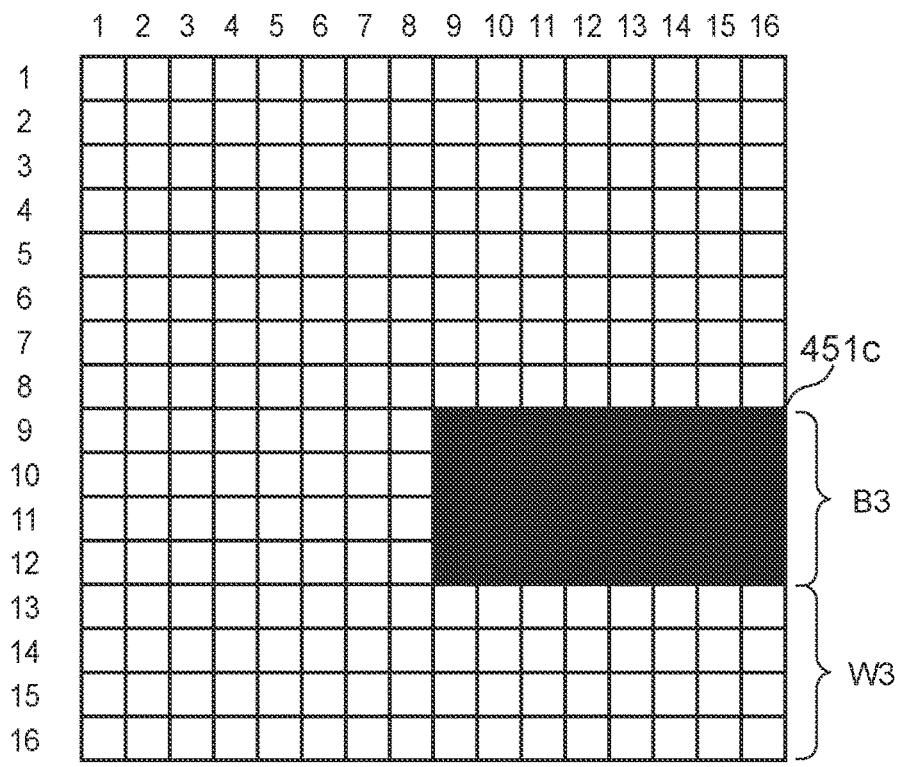
FIG. 8 is a diagram illustrating the structures of position patterns 451*c* and 451*d*.
Figure 8:
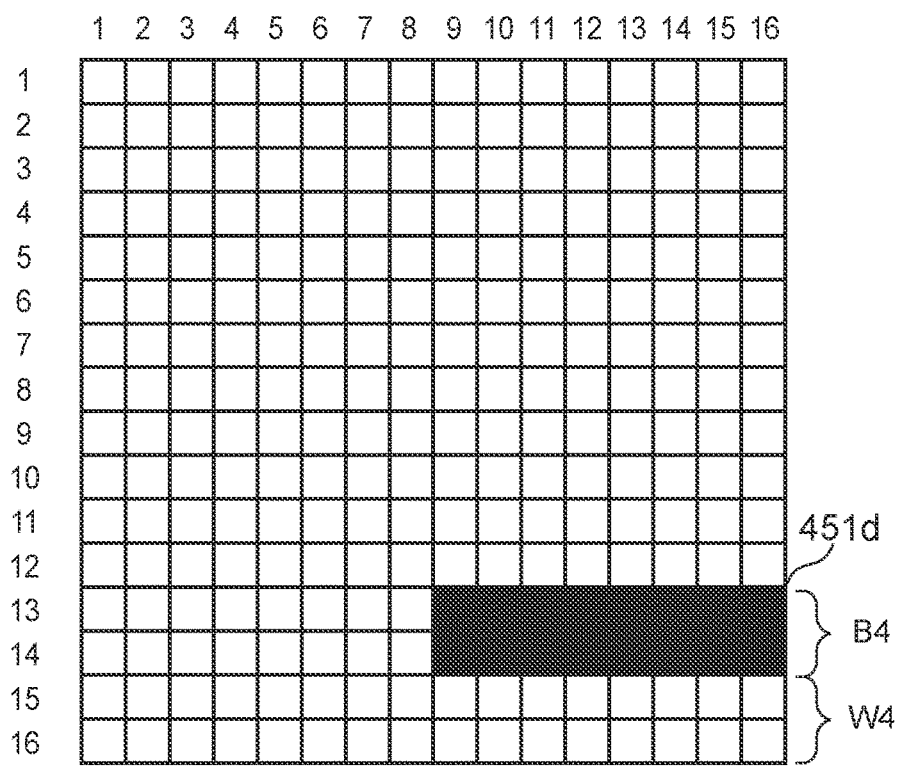
Figure 9:
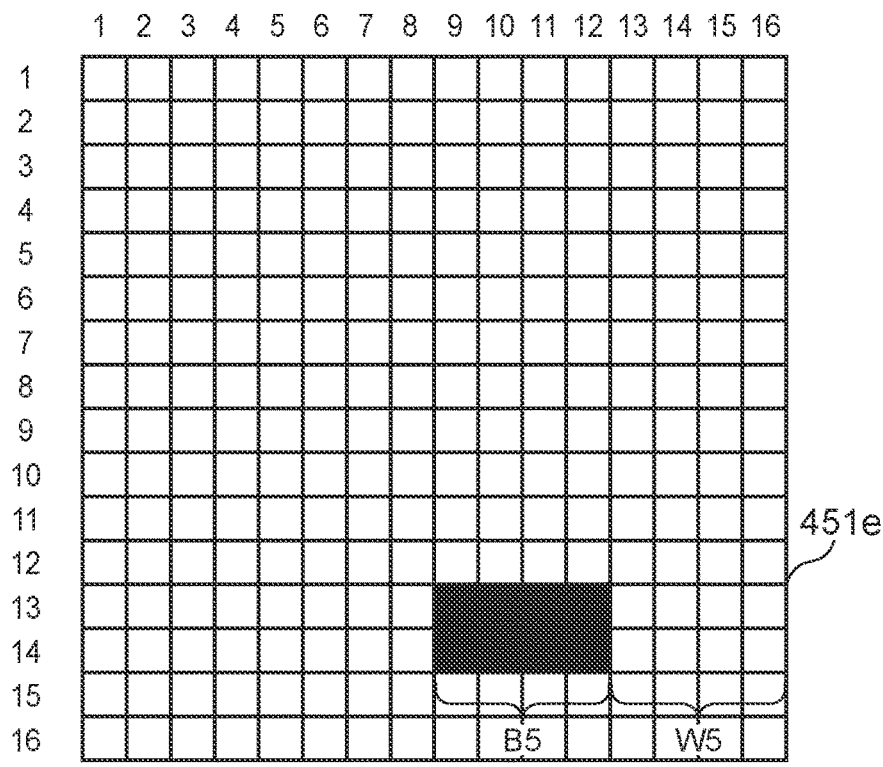
FIG. 9 is a diagram illustrating the structures of position patterns 451*e* and 451*f*.
Figure 9:
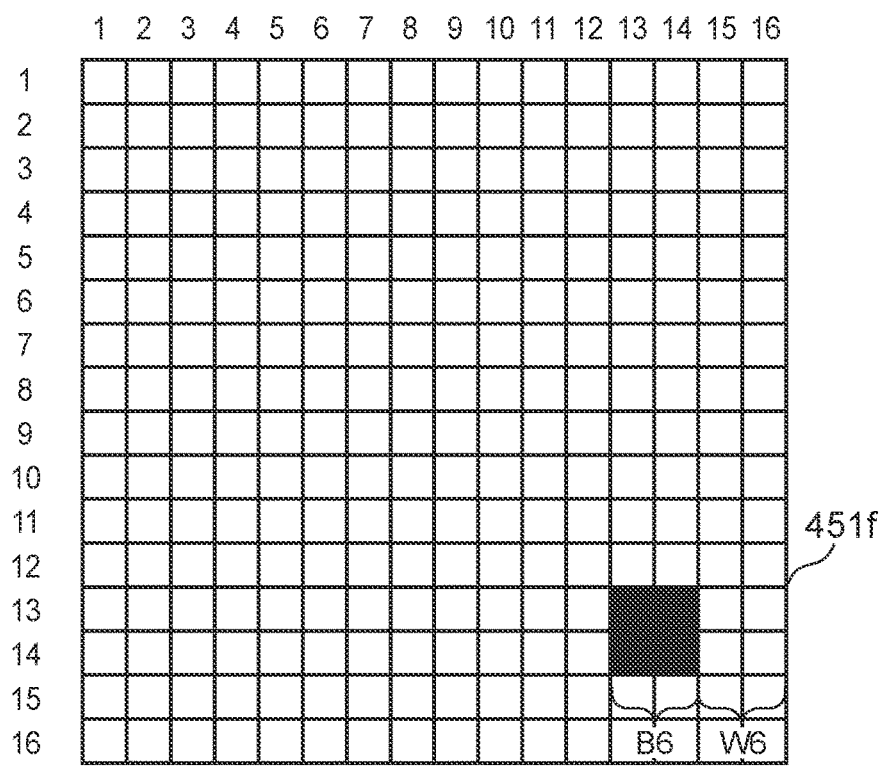
Figure 10:
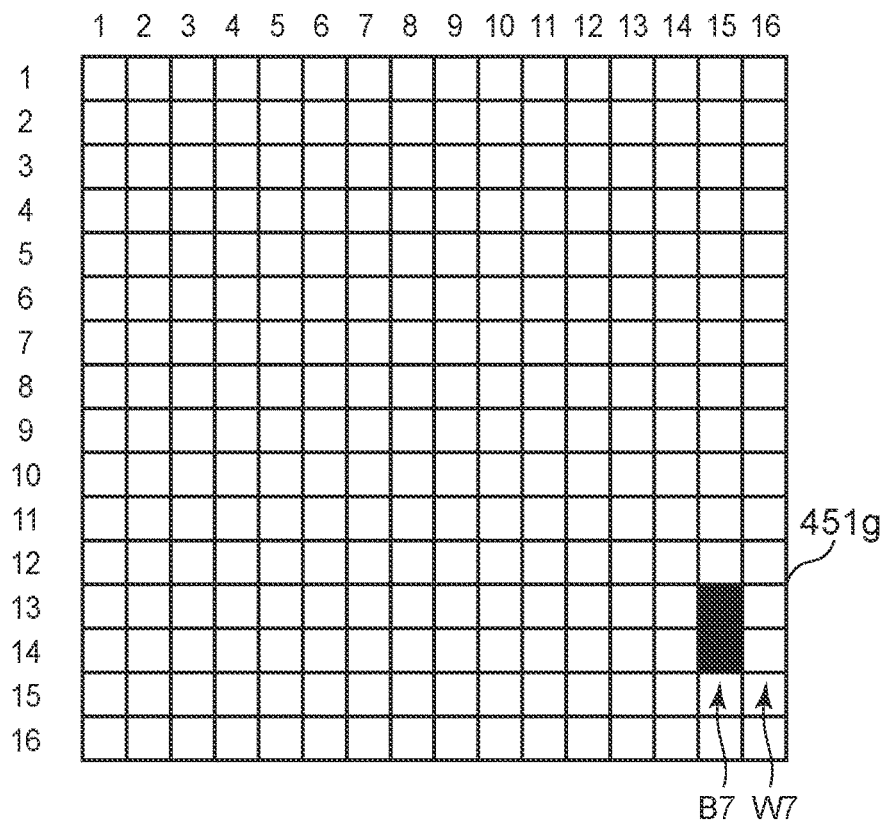
FIG. 10 is a diagram illustrating the structures of position patterns 451*g* and 451*h*.
Figure 10:
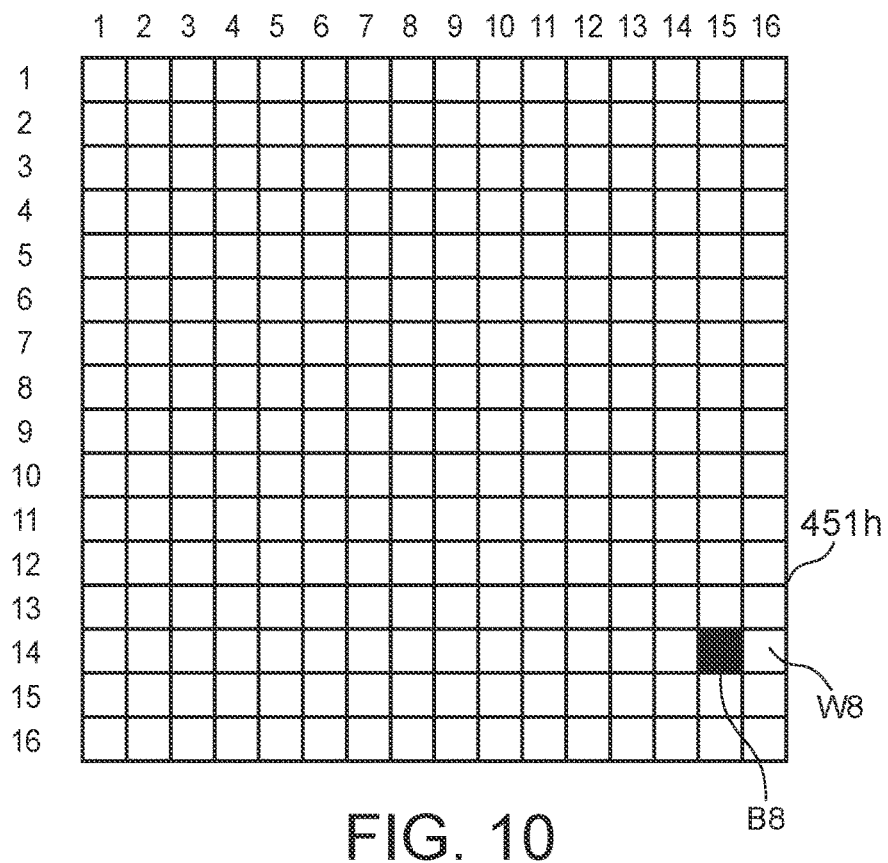

In block 303, the control unit 113, having entered the position determining mode, instructs the pattern output unit 109 to display a predetermined position pattern, and transmits a timing signal 181 (FIG. 11) for synchronizing image capture to the smartphone 200 via the BLTH module 111. In block 305, when the pattern output unit 109 outputs the first position pattern 451a (FIG. 7) to the image data transfer unit 105, the image data transfer unit 105 abandons the data of the application image which has been received from the application execution unit 107, and displays the position pattern 451a on the touchscreen 101.

In block 357, the control unit 207, having received the timing signal 181, instructs the tone calculation unit 205 to capture a still image. Here, the camera module 203 does not need to output monitoring image data for determining the still image capture timing. The tone calculation unit 205 calculates a tone value from imaging data received from the camera module 203. In block 359, the control unit 207 transmits a tone value 191 (FIG. 11) received from the tone calculation unit 205, to the table PC 100 via the BLTH module 213.

In block 307, the control unit 113 determines whether or not the position of the lens 203a is determined. In the case where a plurality of position patterns need to be displayed until the position can be determined, in block 308 the control unit 113 selects the succeeding position patterns 451b to 451h in sequence, and instructs the pattern output unit 109 together with the coordinates on the touchscreen 101. In block 305, the pattern output unit 109 displays the changed position pattern 451b on the touchscreen 101. The changed position pattern is a pattern that enables finer position determination than the immediately preceding position pattern.

Figure 6:
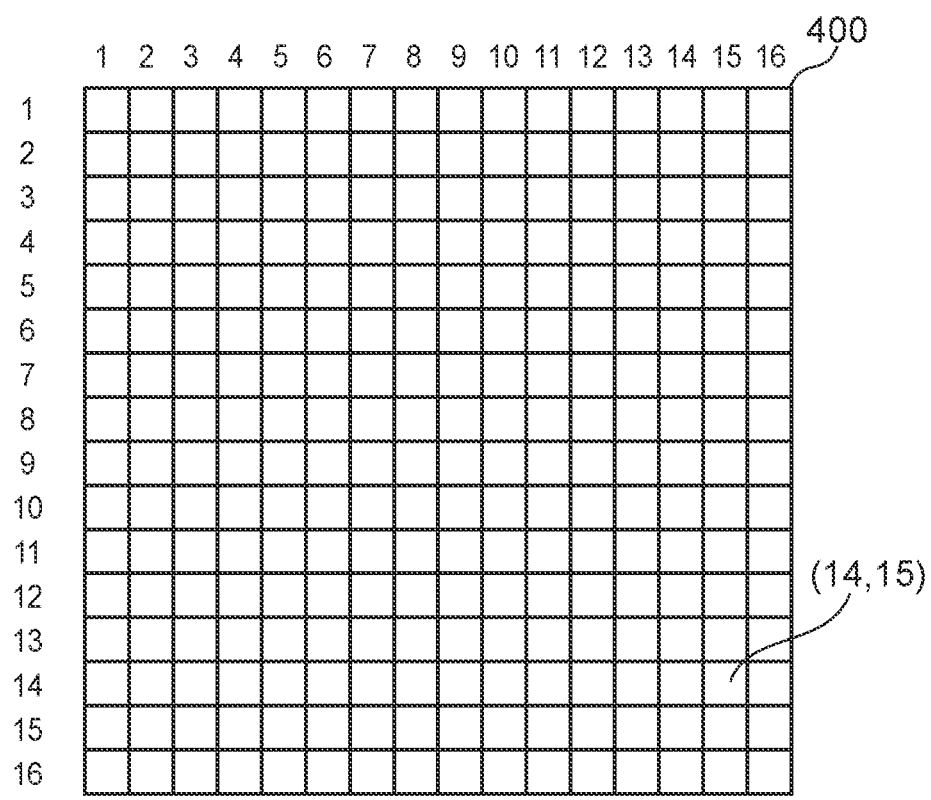
FIG. 6 is a diagram illustrating a matrix 400 defined on a touchscreen 101.
Figure 11:
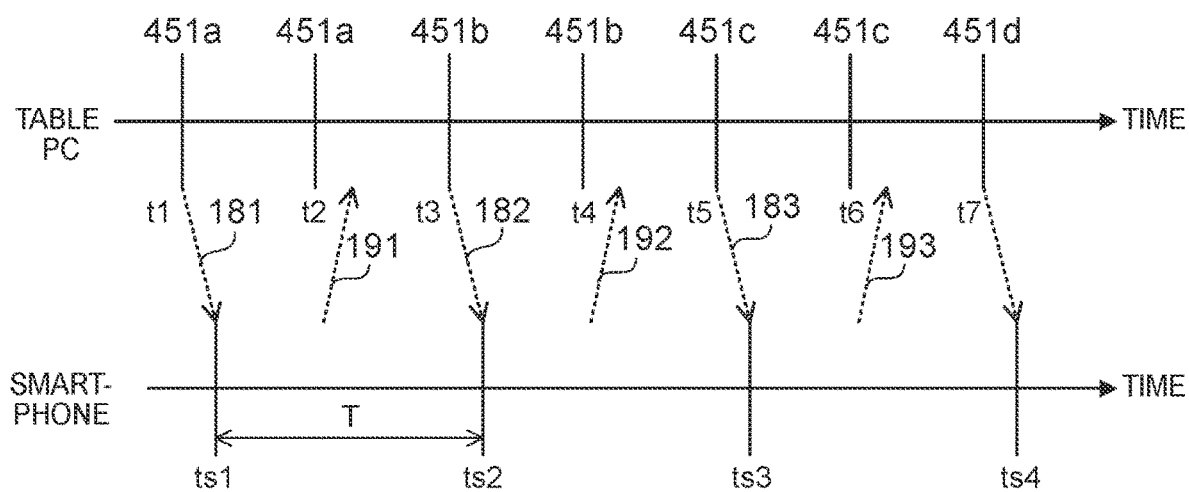
FIG. 11 is a diagram illustrating position pattern display and image capture timings.

The procedure in blocks 305 to 308, 357, and 359 is described in detail below, with reference to FIGS. 6 to 11. FIGS. 6 to 10 are each a diagram illustrating an example of position pattern, and FIG. 11 is a diagram illustrating the period for displaying the position pattern by the table PC 100 and the timing of image capture by the smartphone 200. FIG. 6 illustrates the matrix 400 defined in the display area of the touchscreen 101 by the control unit 113. Although the matrix 400 is shown as a square for ease of explanation, the matrix 400 matches the shape of the display area of the touchscreen 101. As an example, the matrix 400 is made up of 16×16=256 square elements, and the position of each element in the coordinate system of the touchscreen 101 can be identified by the (row, column) numbers.

Each element is desirably a square with which the edges of the lens 203a are inscribed or circumscribed. If each element is larger than this, the accuracy of the determined position decreases. If each element is smaller than this, the number of times a position pattern is displayed for determination is more than necessary. Once the element size is determined depending on the aperture of the lens 203a, the necessary number of elements is determined based on the size of the touchscreen 101 relative to the element size. The number of elements thus depends on the aperture of the lens 203a and the size of the touchscreen 101.

The matrix 400 only needs to be defined in an area where the lens 203a can be present in the display area of the touchscreen 101 when the smartphone 200 is placed. In other words, the matrix 400 does not need to be defined near each side of the touchscreen 101 inaccessible by the lens 203a, depending on the position of the lens 203a in the chassis 251 of the smartphone 200.

The pattern output unit 109 recognizes the number of elements of the matrix 400 and their positions defined on the touchscreen 101. Suppose, when the smartphone 200 is placed on the touchscreen 101, the lens 203a is positioned at the element (14, 15) of the matrix 400. The control unit 113 first selects the position pattern 451a (FIG. 7) of the elements (1, 1) to (16, 16) matching the entire area of the matrix 400, designates the coordinates, and sets the pattern output unit 109.

As an example, the position pattern 451a is a pattern of two tones made up of a white area W1 of the elements (1, 9) to (16, 16) of the maximum luminance and a black area B1 of the elements (1, 1) to (16, 8) of the minimum luminance by vertically dividing the entire matrix 400 into two equal parts. The direction of dividing into two equal parts may be horizontal or diagonal. The same applies to the subsequent procedure. The control unit 113 transmits the timing signal 181 (FIG. 11) via the BLTH module 111, to synchronize the timing ts1 (FIG. 11) of image capture by the smartphone 200 with the display period (t1 to t3) of the position pattern 451a.

The tone calculation unit 205 in the smartphone 200 calculates the tone value of the element (14, 15) at which the lens 203a is positioned. The calculated tone value may be a representative value such as a mean value, center value, or maximum value of the tone values of pixels constituting an imaging device. The control unit 207 transfers the tone value 191 (FIG. 11) received from the tone calculation unit 205, to the table PC 100 via the BLTH module 213. The control unit 113 determines that the smartphone 200 is present in the white area W1, from the received tone value 191, the threshold 161, and the structure of the displayed position pattern 451a.

Next, the control unit 113 instructs the pattern output unit 109 to display the position pattern 451b (FIG. 7) made up of a white area W2 of the elements (9, 9) to (16, 16) of the maximum luminance and a black area B2 of the elements (1, 9) to (8, 16) of the minimum luminance by dividing into two equal parts the white area W1 affirmatively determined as containing the smartphone 200. The control unit 113 transmits a timing signal 182 via the BLTH module 111, to synchronize the timing ts2 (FIG. 11) of image capture by the smartphone 200 with the display period (t3 to t5) of the position pattern 451b.

Here, the image data transfer unit 105 can display the application image generated by the application execution unit 107, in the black area B1 negatively determined as not containing the smartphone 200. The image data transfer unit 105 can equally display the application image in any area negatively determined from the tone position in the subsequent procedure, too. Hence, the area in which the application image is affected by the display decreases gradually.

The control unit 113 determines that the smartphone 200 is present in the white area W2 from a tone value 192 received by the same procedure, and instructs the pattern output unit 109 to display the position pattern 451c (FIG. 8) made up of a white area W3 of the elements (13, 9) to (16, 16) of the maximum luminance and a black area B3 of the elements (9, 9) to (12, 16) of the minimum luminance by dividing the white area W2 into two equal parts.

The control unit 113 determines that the smartphone 200 is present in the white area W3 from a tone value 193 received from the smartphone 200 by the same procedure, and instructs the pattern output unit 109 to display the position pattern 451d (FIG. 8) made up of a white area W4 of the elements (15, 9) to (16, 16) of the maximum luminance and a black area B4 of the elements (13, 9) to (14, 16) of the minimum luminance by dividing the white area W3 into two equal parts.

The control unit 113 repeats the same procedure to display the position patterns 451e (FIG. 9), 451f (FIG. 9), 451g (FIG. 10), and 451f (FIG. 10) in which the white area or black area affirmatively determined based on the tone value received from the smartphone 200 is divided into two equal parts, in sequence. The control unit 113 determines, as the position of the smartphone 200, the element (14, 15) corresponding to the affirmative black area B8 from the tone value received from the smartphone 200 in response to the last displayed position pattern 451h corresponding to two elements.

In FIG. 11, the position patterns 451a to 451h are displayed on the touchscreen 101 at the same frame rate (60 fps) as the refresh rate. FIG. 11 illustrates the situation where, as part of such display, the position patterns 451a to 451d are each displayed in units of 2 frames. The position pattern is changed at times t1, t3, t5, and t7. The smartphone 200 captures the images of the position patterns 451a to 451d respectively at timings ts1, ts2, ts3, and ts4 synchronous with the timing signals generated at times t1, t3, t5, and t7 at which the position pattern is updated.

From timing ts1 to timing ts2, the smartphone 200 captures the image of the position pattern, calculates the tone value, and transmits the tone value. From the reception of the tone value to the next display time t3, the table PC 100 determines the position of the smartphone 200 with respect to the position pattern 451a, selects and displays the new position pattern 451b, and transmits the timing signal 182.

The imaging period T changes depending on these processing times and the frame rate of the image data transfer unit 105.

The camera module 203 may operate in the moving image mode of capturing an image at a frame rate that enables synchronization with the timing of changing the position pattern. In this case, the table PC 100 only needs to transmit the timing signal 181 for capturing the image of the first position pattern 451a and does not need to transmit the subsequent timing signal 182 or 183 each time the position pattern is changed, so that the power consumption of the wireless module 213 can be reduced. Since the number of elements depends on the aperture of the lens 203a and the size of the touchscreen 101 as mentioned above, the number of position patterns is greater when the size of the touchscreen 101 is larger.

When the number of position patterns necessary to determine the position is denoted by x, the application image cannot be displayed in part of the area of the touchscreen 101 for a period of xT, which may cause the screen to flicker though only for a very short period. To prevent this, the image data transfer unit 105 may reserve, for the application image, such a frame rate with which screen flicker is not annoying and assign the remaining time to the frames of the position patterns, instead of continuously concentrating the frame sequence output to the touchscreen 101 on the position patterns.

For example, when outputting image data at a frame rate of 60 fps, the image data transfer unit 105 assigns frames of 90% (54 fps) to the application image, and frames of 10% (6 fps) to the position determining patterns. In such a case, it takes longer time to determine the position than in the case of assigning all frames to the position patterns for a predetermined period, but the display of the application image can be kept unaffected.

The above describes an example of determining the position of one smartphone 200 using the position patterns in FIGS. 7 to 10. There is, however, also an instance where the plurality of smartphones 200a to 200c are simultaneously placed on the touchscreen 101. In this case, the control unit 113 can sequentially determine the positions of the smartphones 200a to 200c which are each determined by the control unit 113 receiving an identifier, by repeatedly performing the same procedure. Here, if the frame sequence is assigned to concentrate on the position patterns, the time during which the display of the application image is affected increases by the number of smartphones. It is therefore advantageous if the positions of the plurality of smartphones can be determined simultaneously without increasing the number of times a position pattern is displayed.

Figure 12:
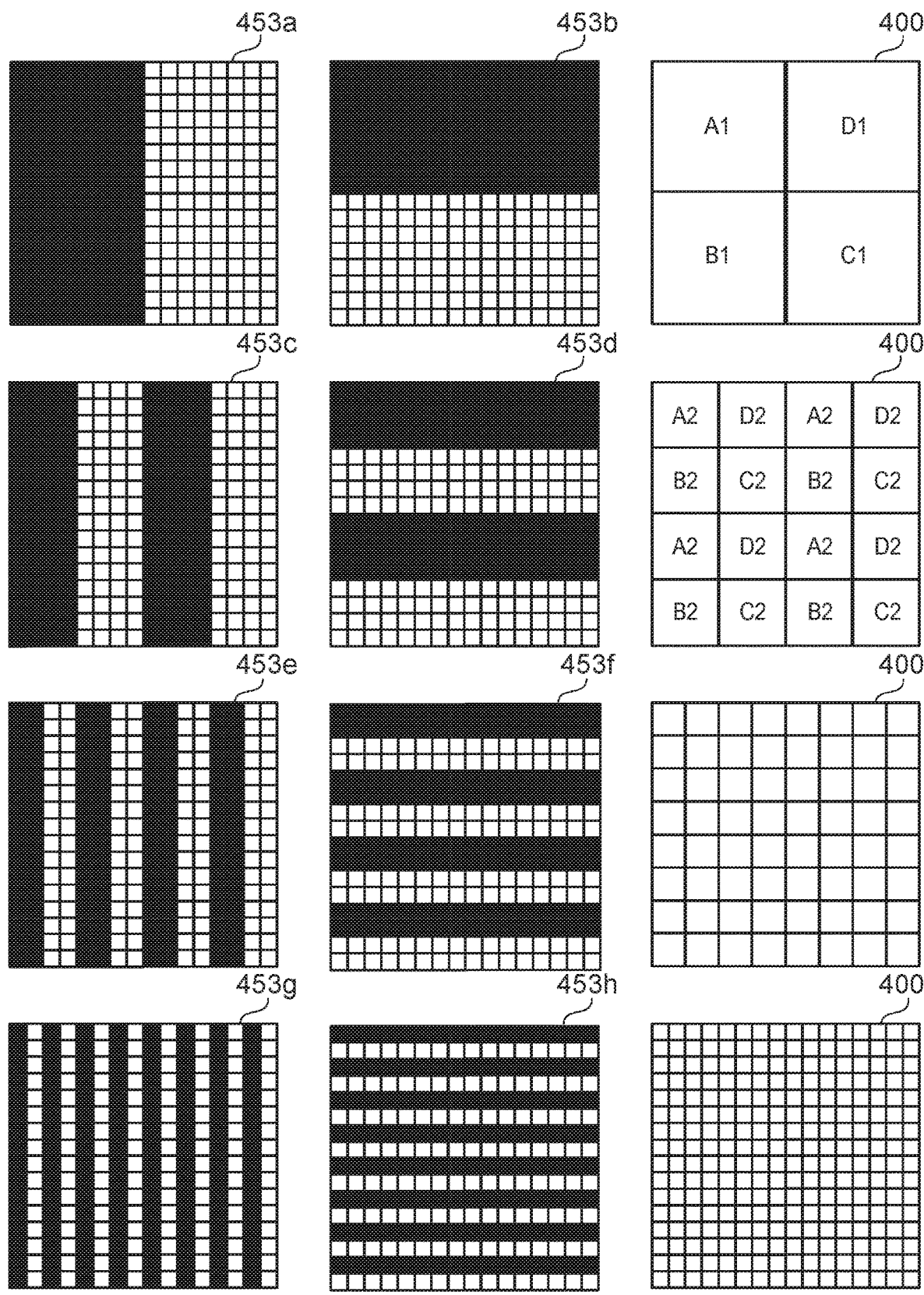
FIG. 12 is a diagram illustrating other structures of position patterns.

For example, a position pattern further divided into two equal parts may be displayed in an area negatively determined by the table PC 100 as not containing any of the smartphones 200a to 200c, such as the black areas B1, B2, and B3, the white area W4, the black areas B5 and B6, and the white area W7 of the respective position patterns 451a to 451g. FIG. 12 illustrates an example of such position patterns as position patterns 453a to 453h. By the table PC 100 receiving a tone value from each of the smartphones 200a to 200c for each of the position patterns 453a to 453h, the positions of the three smartphones 200a to 200c can be determined with eight position patterns as in the case of determining the position of one smartphone as illustrated in FIGS. 6 to 10.

In the procedure described above, the smartphone 200 transmits a tone value each time an image of a position pattern is captured. Alternatively, the smartphone 200 may transmit tone values after capturing images of a plurality of position determining patterns. This is described below, using the position patterns 453a to 453h in FIG. 12 as an example. The following describes an example where each of the smartphones 200a to 200c transmits tone values each time two position patterns are captured. The table PC 100 first displays the position patterns 453a and 453b in sequence. Each of the three smartphones 200a to 200c placed at any positions on the touchscreen 101 calculates tone values for the position patterns 453a and 453b in sequence and store them.

Here, each of the smartphones 200a to 200c present in any of all areas A, B, C, and D of the matrix 400 stores tone values corresponding to any of black-black, black-white, white-black, and white-white. Each of the smartphones 200a to 200c may convert the tone values of two tones into a 2-bit string and transmit it to the table PC 100, or transmit the tone values so that the table PC 100 converts them into a bit string. In either case, by recognizing a bit string [00], [01], [10], or [11], the table PC 100 can determine the position of each of the smartphones 200a to 200c in the range of areas A1 to D1 obtained by dividing the matrix 400 into four equal parts. The table PC 100 then displays the position patterns 453c and 453d in sequence, in the entire area of the matrix 400.

The table PC 100 can determine, based on a 2-bit string, the position of each of the smartphones 200a to 200c in the range of areas A2 to D2 obtained by dividing each of the areas A1 to D1 into four equal parts, using the position patterns 453c and 453d. The table PC 100 can further determine the position in the range of the areas obtained by dividing each of the areas A2 to D2 into four equal parts, using the position patterns 453e and 453f. The table PC 100 can eventually determine the position of each of the plurality of smartphones 200 using the position patterns 453g and 453f. With this method, the number of times the smartphone 200 performs tone value transmission is reduced to half as compared with the method of using the patterns in FIGS. 7 to 10, which contributes to lower power consumption.

Figure 13:
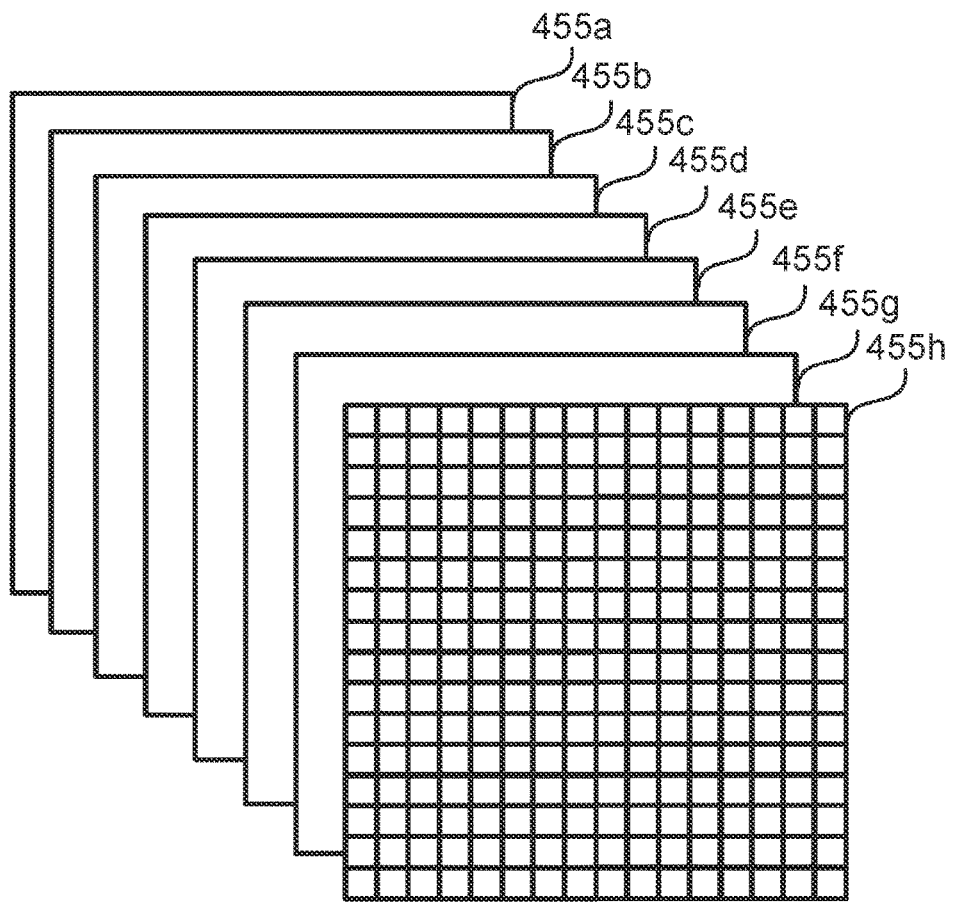
FIG. 13 is a diagram illustrating other structures of position patterns.

FIG. 13 is a diagram illustrating position patterns with which the number of times each of the smartphones 200a to 200c performs tone value transmission is reduced to one. When eight position patterns 455a to 455h are arranged in a time axis, tone values of two tones at the same position of each of the elements (1, 1) to (16, 16) constitute any of the 8-bit strings [00000000] to [11111111]. When the table PC 100 displays the position patterns 455a to 455h in sequence, each of the smartphones 200a to 200c with the lens 203a positioned at any element calculates eight tone values for the position patterns 455a to 455h in sequence. The smartphone 200 does not transmit a tone value or a bit value to the table PC 100, until eight tone values are calculated. The table PC 100 receives an 8-bit string only once, and determines the position of any of the 256 elements captured by each of the smartphones 200a to 200c.

In order to reduce the influence on the display of the application image, it is effective to reduce the number of times a position pattern is displayed. Let Y be the number of elements depending on the size of the touchscreen 101 and the aperture of the lens 203a, and n be the number of patterns. In the case of position patterns of two tones, Y is the n-th power of 2. In the case of position patterns of m tones, Y is typically the n-th power of m. When Y is fixed, increasing the number of tones can reduce the number n of position patterns.

If the table PC 100 or the smartphone 200 identifies a tone value by grayscale, then position patterns of three tones or more can be generated. In the case of three tones, position patterns each obtained by dividing the matrix 400 into three equal parts are generated in sequence. The smartphone 200 may calculate a tone value for each of the color tones of RGB, thus increasing the number of tones to three or more. In this case, by setting the threshold to the result of logical operation of the tone value of each of RGB, position patterns of four colors or more can be formed.

Figure 14:
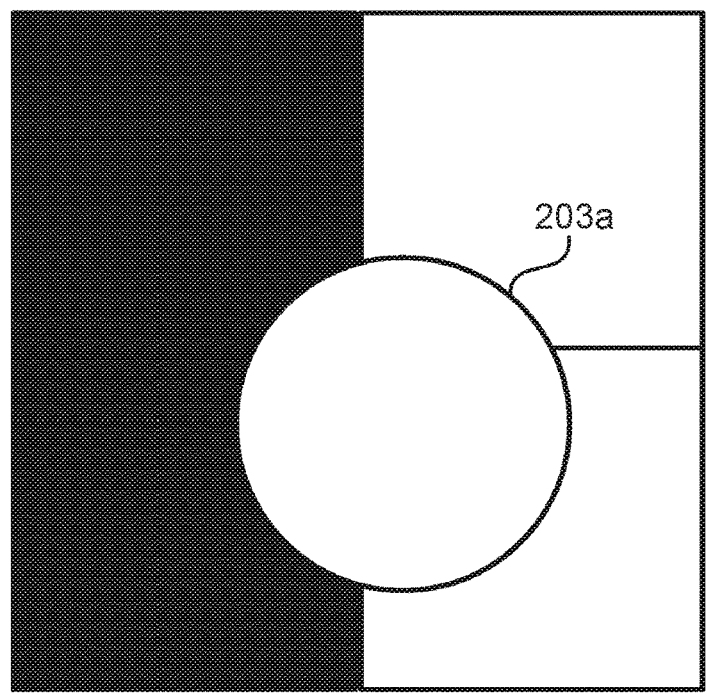
FIG. 14 is a diagram for describing a process when a lens 203*a* is positioned at a boundary of black and white areas.

FIG. 14 is a diagram for describing a process when the position cannot be determined in the case of determining a position pattern of two tones using the threshold 161 (FIG. 2). Since the smartphone 200 is placed at any position, the lens 203a is usually positioned over a boundary of white and black areas, rather than being completely contained within any of the elements of the matrix 400. In this case, when the table PC 100 sets the threshold 161 for the tone value, the determination of the tone value involves the gray range, and the tone value cannot be determined as black or white. If two thresholds are generated with the gray range being excluded from the threshold 161 and black or white is determined based on the magnitude of the tone value, the position may not be able to be determined eventually.

Suppose the table PC 100 recognizes the aperture of the lens 203a beforehand. The table PC 100 abandons a position pattern regarding which a tone value that cannot be determined or should not be determined is received, and displays the same position pattern with the display position being shifted within the range of the aperture of the lens 203a. By repeating the shift and display until the camera module 203 captures an image that enables determination of black or white with the threshold 161, the position can be determined eventually.

Figure 15:
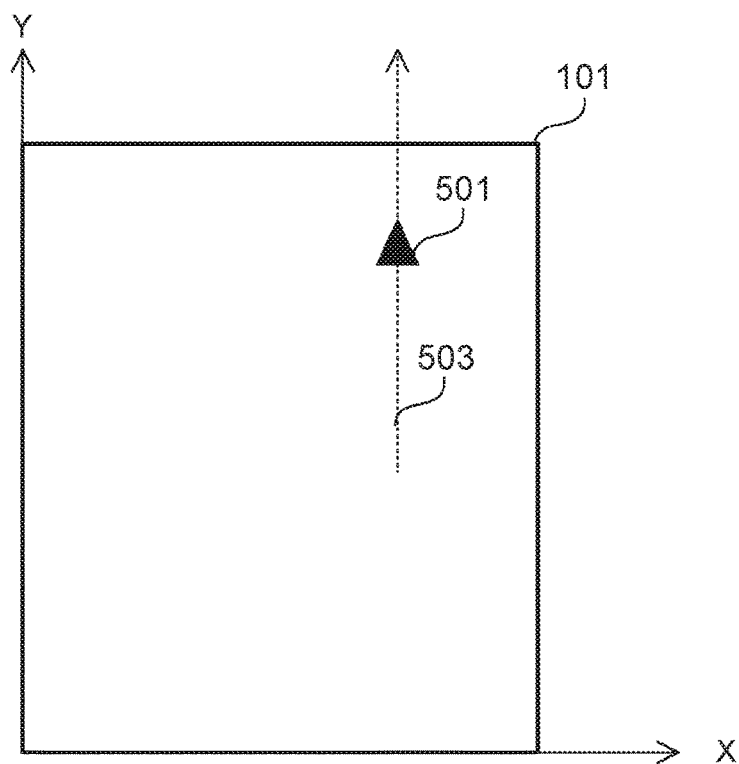
FIG. 15 is a diagram illustrating a situation where the direction and orientation of the smartphone 200 are determined.
Figure 15:
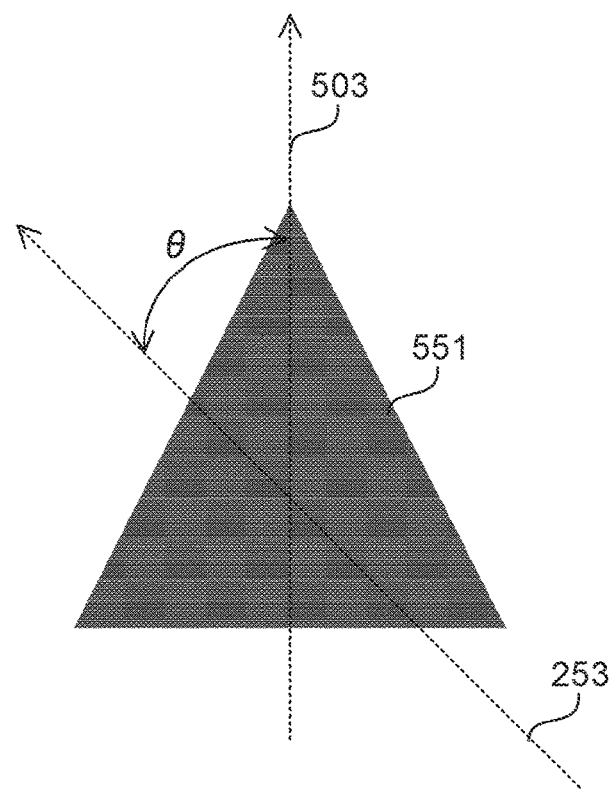

Referring back to FIG. 5, in block 309 the control unit 113, having determined the position, instructs the pattern output unit 109 to display a direction pattern at the determined position. The pattern output unit 109 displays a direction pattern 501 of an isosceles triangle as illustrated in FIG. 15 as an example at the determined position, along a line 503 in parallel with the Y axis of the X-Y coordinates defined on the touchscreen 101. The direction pattern 501 is a pattern with which the direction and the orientation can be determined simultaneously. Alternatively, two patterns, i.e. a pattern of a straight line for determining the direction and a pattern of a triangle for determining the orientation, may be displayed in sequence.

In block 361, the tone calculation unit 205 acquires imaging data corresponding to a blurred image 551. The tone calculation unit 205 extracts the contour of the blurred image 551, specifies the line 503 corresponding to the center line of the isosceles triangle, and further specifies the orientation of the isosceles triangle. The tone calculation unit 205 calculates the angle θ of a line 253 to the line 503. In block 363, the control unit 207 transfers the angle θ to the table PC 100 via the BLTH module 213. The angle θ corresponds to the direction and orientation of the smartphone 200 in the coordinate system of the touchscreen 101.

The smartphone 100 may transmit image data obtained by capturing the direction pattern 501 to the table PC 100, from which the control unit 113 recognizes the direction and the orientation. With the foregoing procedure, the position of the lens 203a and the direction and orientation of the chassis 251 can be determined. To display a convenient UI around the smartphone 200, it is more advantageous if additional information relating to the geometrical feature of the smartphone 200 is available.

In block 311, the control unit 113, having received the angle θ, requests attribute information from the smartphone 200. The attribute information is information necessary for the table PC 100 to recognize the contour of the chassis 251 of the smartphone 200 placed on the touchscreen 101. Specific examples of the attribute information include the position of the lens 203a relative to the chassis 251, the shape of the chassis 251, the size of the chassis 251, the manufacturer name, and the model name. In block 365, the smartphone 200 transmits the attribute information.

In blocks 313 and 367, the table PC 100 and the smartphone 200 each switch to use mode. In block 315, the application execution unit 107 in the table PC 100 selects a position that is near the smartphone 200 and facilitates use with the orientation of the smartphone 200, and displays the UI on the touchscreen 101. Once the UI is displayed, the user can use the UI to the smartphone 200 and the table PC 100 in block 369.

In block 371, the user may remove the smartphone 200 which has been placed on the touchscreen 101 and switched to the use mode. The placement determination unit 211 detects the removal based on the operation of the attitude sensor 209. In block 373, the control unit 207 notifies the table PC 100 that the smartphone 200 is to separate from the group of the cooperation. In block 317, the table PC 100 clears the UI and performs a separation process.

In block 375, a new smartphone 200 is placed on the touchscreen 101 to join the group. In block 377, the control unit 207 notifies the placement as in block 355. The table PC 100 accordingly determines the position, direction, and orientation of the new smartphone 200 joining the group, acquires attribute information, and displays the UI around the smartphone 200, by the procedure described above. In this case, by displaying the position patterns using part of the frame sequence of the application image as mentioned above, the display of the application image can be kept unaffected.

What is claimed is:

1. An apparatus comprising:
   a display;
   a processor;
   a memory that stores code executable by the processor to:
     receive a signal from a portable electronic device signaling that the portable electronic device has determined that the portable electronic device has been placed on the display;
     output display data of an identification image to the display in response to receiving the signal from the portable electronic device;
     receive from the portable electronic device identification data relating to imaging data obtained by capturing the identification image using a camera of a portable electronic device placed on the display, wherein the identification data comprises a tone value corresponding to the imaging data, and the tone value is calculated by computing a mean value, a center value, or a maximum value of individual tone values of a plurality of pixels of the identification image; and
     determine a position of the portable electronic device on the display, based on the identification image and the identification data, wherein the display comprises a plurality of grid elements arranged in a grid matrix and displayed on the display, each grid element of the plurality of grid elements comprises a plurality of pixels, the position of the portable electronic device on the display is determined by comparing the tone value to a display pattern displayed on the plurality of grid elements.

2. The apparatus of claim 1, wherein a distance of the identification image from the camera is shorter than a distance that allows the camera to be brought into focus.

3. The apparatus of claim 1, wherein the identification image comprises a pattern of two tones.

4. The apparatus of claim 1, wherein the identification image comprises a grayscale pattern.

5. The apparatus of claim 1, wherein the identification image comprises a color pattern.

6. The apparatus of claim 1, wherein outputting display data of an identification image to the display comprises outputting display data of a plurality of identification images in sequence, each identification image allowing the position to be determined more finely than a preceding identification image.

7. The apparatus of claim 6, wherein determining a position of the portable electronic device determining the position based on a last displayed identification image and identification data relating to the last displayed identification image.

8. The apparatus of claim 1, wherein the output display data of the identification image is transmitted to a specified position on the display for determining a direction of the portable electronic device.

9. The apparatus of claim 1, wherein the outputted display data of an application image is transmitted at a predetermined frame rate, and further comprising modifying the predetermined frame rate and assigning part of frames to the identification image.

10. The apparatus of claim 1, wherein the portable electronic device comprises:
    a camera; and
    a memory that stores code executable by the processor to:
      calculate identification data relating to imaging data obtained by capturing an identification image displayed on the display by the camera in a state where the portable electronic device is placed on the touchscreen; and
      transmit the identification data to the computing device so that the computing device determines a position of the portable electronic device on the display.

11. The apparatus of claim 10, wherein the imaging data is data of a blurred image.

12. The apparatus of claim 1, wherein output display data of an identification image to the display comprises displaying identification images on the display in sequence, each identification image allowing the position to be determined more finely than a preceding identification image, and
    wherein receiving from the portable electronic device identification data relating to imaging data comprises receiving identification data each time an identification image is captured.

13. The apparatus of claim 1, wherein output display data of an identification image to the display comprises displaying identification images on the display in sequence, each identification image allowing the position to be determined more finely than a preceding identification image, and
    wherein receiving from the portable electronic device identification data relating to imaging data comprises receiving arranged in image capture order, after the identification images are captured.

14. The apparatus of claim 1, wherein the code is further executable by the processor to receive attribute information for determining a physical shape of the portable electronic device, and utilize the attribute information in determining a position of the portable electronic device on the display.

15. A method comprising:
receiving, at a parent device, a signal from a portable electronic device signaling that the portable electronic device has determined that the portable electronic device has been placed on a display;
displaying, on the parent device, an identification image on the display in response to the parent device receiving the signal from the portable electronic device;
capturing the identification image with a camera of the portable electronic device resting on the display;
the portable electronic device transmitting identification data relating to imaging data obtained by capturing the identification image to the parent device, wherein the identification data comprises a tone value corresponding to the imaging data, and the tone value is calculated by computing a mean value, a center value, or a maximum value of individual tone values of a plurality of pixels of the identification image; and
determining the position of the portable electronic device on the display based on the identification image and the identification data, wherein the display comprises a plurality of grid elements arranged in a grid matrix and displayed on the display, each grid element of the plurality of grid elements comprises a plurality of pixels, the position of the portable electronic device on the display is determined by comparing the tone value to a display pattern displayed on the plurality of grid elements.

16. The method of claim 15, further comprising;
displaying the identification image in a shifted position within a range of a lens aperture of the camera when the position of the portable electronic device is unable to be determined based on the identification image and the identification data.

17. The method of claim 15, further comprising:
the parent device displaying a second identification image more finely segmented than the first identification image, on the display;
transmitting second identification data relating to imaging data obtained by capturing the second identification image, to the parent device; and
wherein determining the position of each of the portable electronic device uses the second identification image and the second identification data.

18. A program product comprising a computer readable storage medium that stores code executable by a processor, the executable code comprising code to perform:
receiving a signal from a portable electronic device signaling that the portable electronic device has determined that the portable electronic device has been placed on a display;
displaying an identification image on the display in response to receiving the signal from the portable electronic device;
receiving from the portable electronic device placed on the display identification data relating to imaging data obtained by capturing the identification image with a camera of the portable electronic device, wherein the identification data comprises a tone value corresponding to the imaging data, and the tone value is calculated by computing a mean value, a center value, or a maximum value of individual tone values of a plurality of pixels of the identification image; and
determining the position of the portable electronic device based on the identification image and the identification data, wherein the display comprises a plurality of grid elements arranged in a grid matrix and displayed on the display, each grid element of the plurality of grid elements comprises a plurality of pixels, the position of the portable electronic device on the display is determined by comparing the tone value to a display pattern displayed on the plurality of grid elements.

19. The program product of claim 18, wherein displaying an identification image comprises displaying data of a plurality of identification images in sequence, each identification image allowing the position to be determined more finely than a preceding identification image.

* * * * *